(12) United States Patent
Memory

(10) Patent No.: US 6,240,861 B1
(45) Date of Patent: Jun. 5, 2001

(54) SPLIT METER ROLLER FOR AGRICULTURAL AIR CARTS

(75) Inventor: Russell J. Memory, Saskatoon (CA)

(73) Assignee: Flexi-Coil Ltd., Saskatoon (CA)

( * ) Notice: Subject to any disclaimer, the term of this patent is extended or adjusted under 35 U.S.C. 154(b) by 0 days.

(21) Appl. No.: 09/428,524

(22) Filed: Oct. 28, 1999

(51) Int. Cl.[7] ..................................................... A01C 7/20
(52) U.S. Cl. ............................................ 111/178; 111/200
(58) Field of Search ..................................... 111/178, 177, 111/200, 170; 222/608, 609, 610, 271, 281, 278, 368; 192/50, 32, 41 R

(56) References Cited

U.S. PATENT DOCUMENTS

| | | | |
|---|---|---|---|
| 3,982,670 | 9/1976 | Brass | 222/177 |
| 4,508,243 | 4/1985 | Deutsch et al. | 222/142 |
| 5,024,173 | 6/1991 | Deckler | 111/178 |
| 5,078,066 | 1/1992 | Lafferty | 111/178 |
| 5,632,212 | 5/1997 | Barry | 111/178 X |

FOREIGN PATENT DOCUMENTS 1149235    7/1983   (CA) .

OTHER PUBLICATIONS

Morris, Air Seeder, 2–page Brochure, 1988 (Est.).
John Deere, Air Seeding Systems, 5–page Brochure, 1998.
John Deere, Operator's Manual: 1900 Commodity Air Cart, 1997.
Flexi–Coil Ltd., Operator's Manual: 320 Third Tank, 1997.
Beeline, Beeline Granular Applicators, 8–page Brochure, 1986 (Est.).

Primary Examiner—Christopher J. Novosad
(74) Attorney, Agent, or Firm—Larry W. Miller; John William Stader

(57) ABSTRACT

A metering system for an air cart is provided in which a portion, preferably one-half, of a meter roller can be selectively disengaged from a common drive input. The metering system typically comprises two roller halves located in a common housing. The driven half of the meter roller is directly rotated by the rotation of the drive input. In a preferred embodiment of the invention, the controlled half of the meter roller is engaged or disengaged from rotation by a wrap spring clutch. The drive input does not engage the controlled meter roller half directly. Instead, the drive input extends within a hollow shaft which extends through the controlled half of the meter roller with the drive input lying concentrically within it. When only half the meter roller is required, the operator can disengage the clutch and stop rotation of the controlled half of the meter roller without stopping the operation of the air cart. In other words, the drive input provides continued rotation of the driven half of the roller with rotation of the controlled half being dependent on activation and deactivation of the clutch. This unique design enables the meter assembly to be contained in a common housing while providing a simple ways for controlling a portion, e.g. half, of the meter roller. The clutch may be remotely activated by the operator. Therefore, when the operator requires the entire meter roller to rotate, the clutch is engaged. When only half the meter roller is required, the operator can disengage the clutch and stop rotation of the controlled half of the meter roller without stopping overall operation of the air cart.

25 Claims, 8 Drawing Sheets

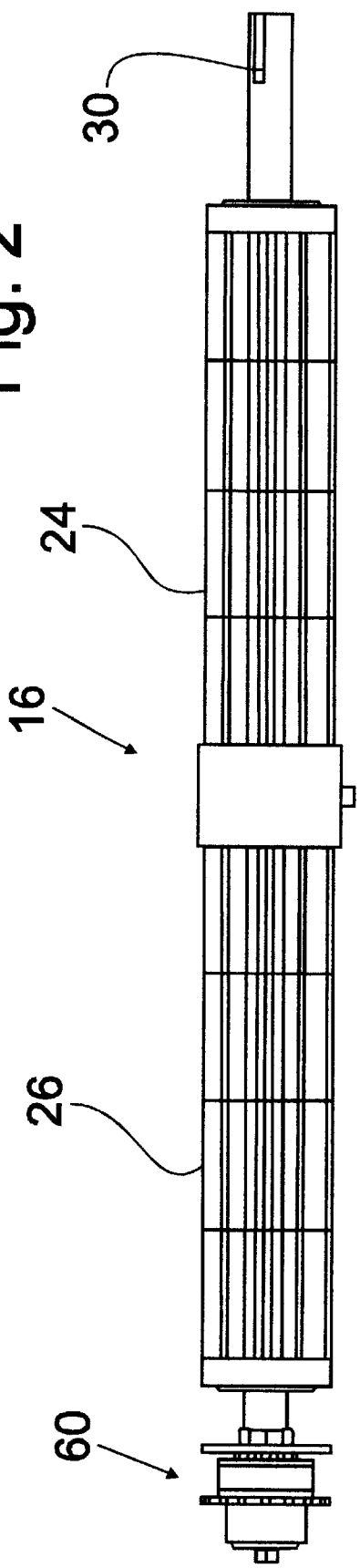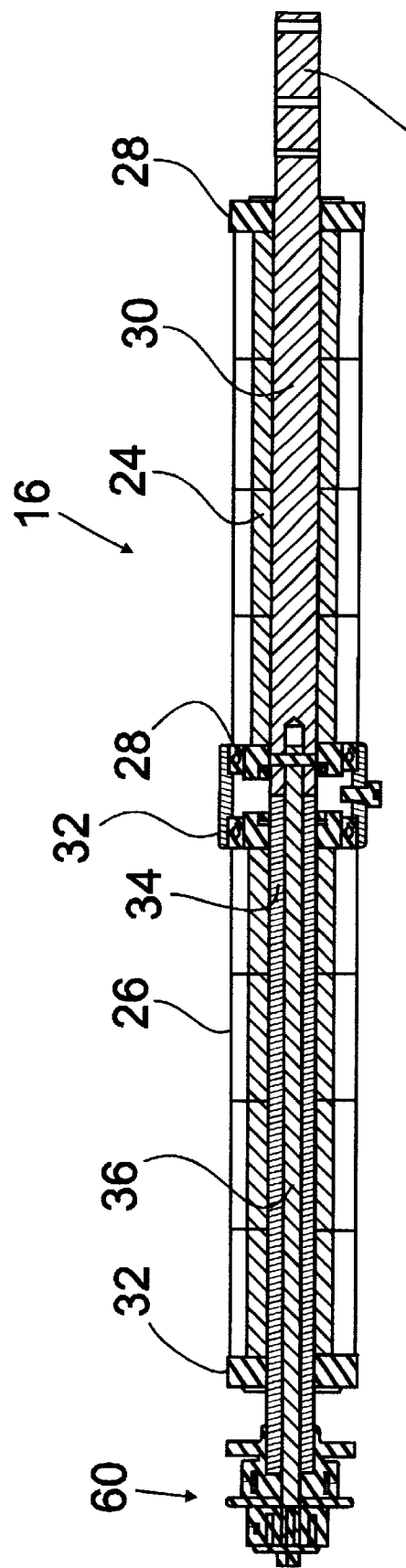

SPLIT METER ROLLER FOR AGRICULTURAL AIR CARTS

BACKGROUND OF THE INVENTION

This invention relates generally to agricultural air carts and, more specifically, to apparatus for selectively controlling the operation of the air cart metering system.

As the size of agricultural implements continues to grow, the versatility of such implements becomes more significant. Large seeding implements serve to aid the farmer in efficiently seeding his fields in less time. However, a significant problem arises from this situation. Farmland is not sized in proportion to the implement size thereby creating a dilemma for the operator when only half the implement width is remaining as a final seeding pass. It simply is not acceptable for the operator to double seed a pass of half the width of the implement in order to seed the last remaining section of land. In doing so, seeds are wasted and consistent crop yield is sacrificed. In the alternative, it is also not acceptable for the last pass not to be seeded at all. Unused land is wasted crop production land.

Metering systems commonly have means to isolate a selected meter box from operation. Therefore, the ground openers associated with the particular meter that has been shut off do not receive seed. This allows the operator to traverse land with the implement without utilizing the entire implement width for seeding. In U.S. Pat. No. 5,078,066 a wrap spring clutch allows for disengagement of individual meter rollers from the rotational actuation of the common shaft on which they are mounted. The operator can selectively disengage meter rollers from rotation either automatically (electrically) or mechanically. U.S. Pat. No. 5,024,173 discloses a dispenser that utilizes a spring to bias a clutch assembly to engage with a metering roller. A control knob and cam are used to move the clutch assembly away from the metering roller(s) in order to disengage them. Various other means of disengaging separate meter rollers from their drives are disclosed in U.S. Pat. Nos. 5,632,212, 3,982,670 and U.S. Pat. No. 4,508,243. In all this prior art, means are provided to shut off the rotation of whole meter rollers in systems where multiple meter rollers are provided. However, they do not provide means to selectively shut off or disable a portion, e.g. one-half of a metering roller located in a common housing.

Canadian Patent 1,149,235 discloses a means to disengage one or-more meter rollers within a common housing. However, this system is manually operated and the operator must stop the implement and exit his tractor cab. In addition, much of the prior art also relies on a multitude of mechanical parts giving way to significant maintenance problems and expenses.

Other implements offering the ability to isolate a meter box from operation are the Morris 7000 Series air seeder and John Deere 1900 Commodity air cart.

SUMMARY OF THE INVENTION

It is an object of this invention to provide a metering system for an air cart wherein a meter roller comprises two parts adapted to be located in a common housing with means for selectively controlling the on/off operation of one part of the meter roller.

It is another object of this invention to provide a metering system enabling remote control of a portion of the meter roller and without requiring the operator to stop the operation of the air cart.

It is a further object of this invention to provide a meter roller assembly having a simple, compact and economically feasible design.

The invention provides an improved metering assembly for an air cart to dispense product from a centralized tank to the air distribution system of the air cart.

The invention in one aspect provides a product metering system for an air cart or the like including a meter roll having first and second axially aligned meter roll portions; a main drive shaft and a secondary drive shaft fixed to said main drive shaft for rotation therewith, the first roll portion being fixedly mounted on said main drive shaft for rotation therewith, said secondary drive shaft being co-axially arranged with and extending through said second roll portion, with said first roll portion and the main and secondary drive shafts being rotatable relative to said second roll portion, and a mechanism interacting between said secondary drive shaft and said second roll portion for connecting the latter to said secondary drive shaft for rotation therewith and for disconnecting the same whereby said first roll portion may continue to rotate while rotation of said second roll portion is stopped.

Preferably said mechanism is a clutch mechanism operable on command to effect said connecting and disconnecting functions.

In a preferred form of the invention said main drive shaft is connectable at one end of the meter roll to a main drive input and said clutch mechanism is located at the opposing end of the meter roll.

In a further preferred form said second roll portion is mounted on and fixed to a hollow shaft which extends through said second roll portion and outwardly of said opposing end of the meter roll, said secondary drive shaft extending co-axially through the center of said hollow shaft and outwardly a distance beyond an outboard end portion of said hollow shaft.

In a preferred embodiment of the invention said clutch mechanism includes a driving member fixed to an outboard end of said secondary drive shaft for rotation therewith, a driven member fixed to the outboard end portion of said hollow shaft, and clutching means for interacting between said driving and driven members for effecting a connecting and disconnecting action between said members.

Still further according to a preferred form of the invention said clutch mechanism includes a clutch coil spring wrapped around said driving and driven members, and a control element mounted for rotation relative to said secondary drive shaft, said clutch spring having one end anchored to said driven member and an opposite end anchored to said control element with the direction of wrap of said clutch spring being such that (a) when said control element is free to rotate with said driving and driven members, rotation of said driving member tends to tighten said spring around said driving/driven members so that the rotation of said driving member is transmitted to said driven member; and (b) when said control element is prevented from rotating with said driving member, said spring tends to loosen around at least said driving member thereby to disconnect the driving relation between said members.

In a further aspect of the invention said first and second roll portions are located in a common meter roller housing, said housing having first and second outlet openings for the metered product associated with the respective first and second roll portions.

The above-noted clutch mechanism is preferably located outboard of an end portion of said housing with said main drive shaft being connectable to a main drive input at the opposing end of said housing.

The first and second roll portions are preferably located in a common meter roller housing, said housing having first and second outlet openings for the metered product associated with the respective first and second roll portions and wherein said clutch mechanism is located outboard of an end portion of said housing with said main drive shaft being connectable to a main drive input at the opposing end of said housing, and a control mechanism for stopping rotation of said control element, on command, whereby to disconnect said clutch.

In a preferred form of the invention said control mechanism includes a solenoid controlled latch engageable with said control element on command for stopping the rotation thereof.

In further summary, in one embodiment, a metering system for an air cart is provided in which a portion, preferably one-half, of a meter roller can be selectively disengaged from a common drive input. The metering system typically comprises two roller halves located in a common housing. The driven half of the meter roller is directly rotated by the rotation of the drive input. In a preferred embodiment of the invention, the controlled half of the meter roller is engaged or disengaged from rotation by a wrap spring clutch. The drive input does not engage the controlled meter roller half directly. Instead, the drive input extends within a hollow shaft which extends through the controlled half of the meter roller with the drive input lying concentrically within it. When only half the meter roller is required, the operator can disengage the clutch and stop rotation of the controlled half of the meter roller without stopping the operation of the air cart. In other words, the drive input provides continued rotation of the driven half of the roller with rotation of the controlled half being dependent on activation and deactivation of the clutch. This unique design enables the meter assembly to be contained in a common housing while providing a simple means for controlling a portion, e.g. half, of the meter roller. The clutch may be remotely activated by the operator. Therefore, when the operator requires the entire meter roller to rotate, the clutch is engaged. When only half the meter roller is required, the operator can disengage the clutch and stop rotation of the controlled half of the meter roller without stopping overall operation of the air cart.

These and other objects features and advantages are accomplished according to the instant invention by providing a metering system for an air cart in which a portion, preferably one-half, of a meter roller can be selectively disengaged from a common drive input. The metering system typically comprises two roller halves located in a common housing. The driven half of the meter roller is directly rotated by the rotation of the drive input. In a preferred embodiment of the invention, the controlled half of the meter roller is engaged or disengaged from rotation by a wrap spring clutch. The drive input does not engage the controlled meter roller half directly. Instead, the drive input extends within a hollow shaft which extends through the controlled half of the meter roller with the drive input lying concentrically within it. When only half the meter roller is required, the operator can disengage the clutch and stop rotation of the controlled half of the meter roller without stopping the operation of the air cart. In other words, the drive input provides continued rotation of the driven half of the roller with rotation of the controlled half being dependent on activation and deactivation of the clutch. This unique design enables the meter assembly to be contained in a common housing while providing a simple means for controlling a portion, e.g. half, of the meter roller. The clutch may be remotely activated by the operator. Therefore, when the operator requires the entire meter roller to rotate, the clutch is engaged. When only half the meter roller is required, the operator can disengage the clutch and stop rotation of the controlled half of the meter roller without stopping overall operation of the air cart.

BRIEF DESCRIPTION OF THE DRAWINGS

FIG. 2 is an elevation view of a split meter roller assembly according to a preferred embodiment of the invention;

FIG. 2A is a longitudinal section view of the split meter roller assembly;

DETAILED DESCRIPTION OF THE PREFERRED EMBODIMENT

Figure 1:
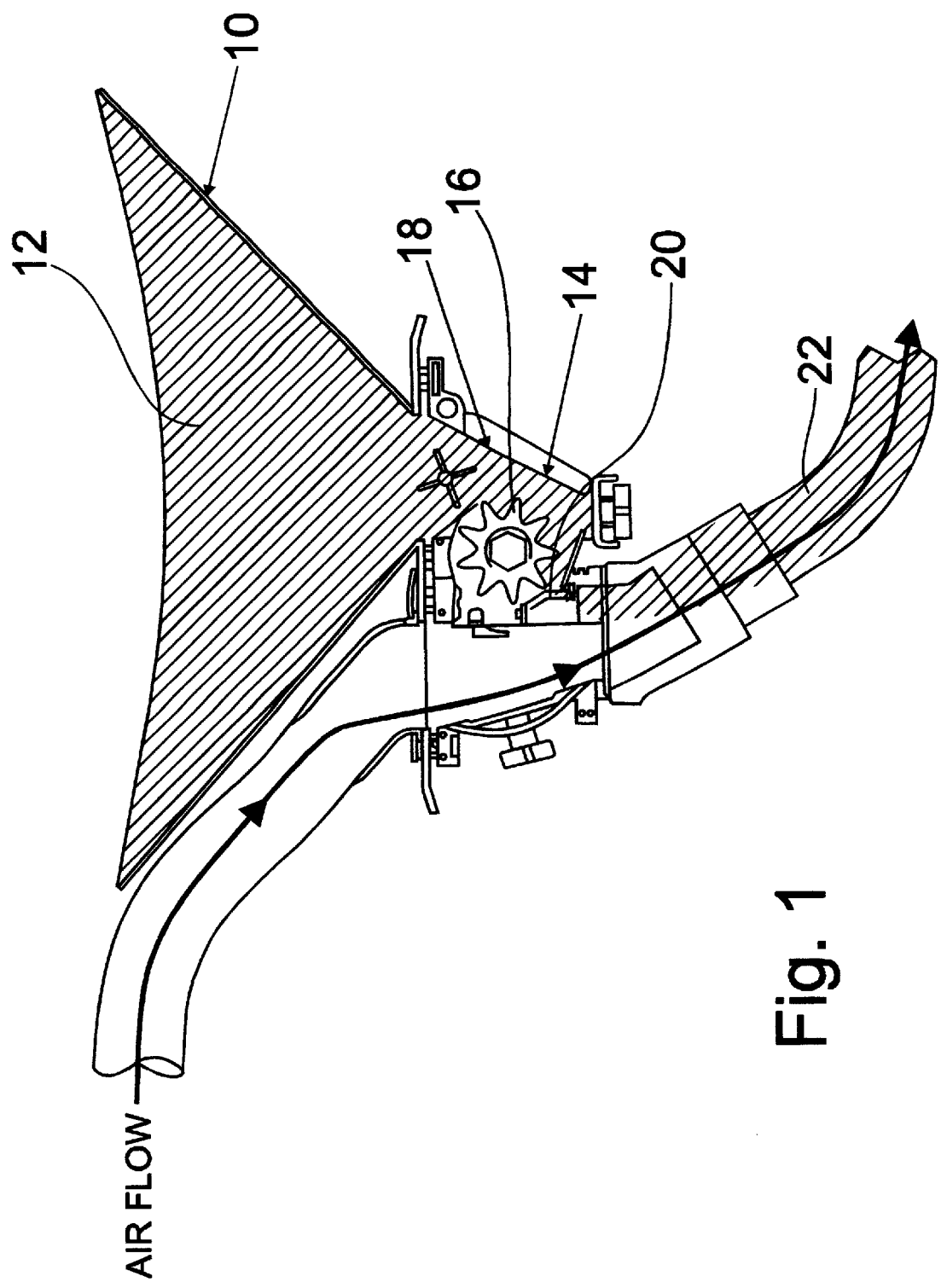
FIG. 1 is a partial cross-sectional view of an air cart metering and air distribution system.

A typical air cart as known in the industry (FIG. 1) has at least one tank 10 for storing product 12. Each tank 10 is equipped with a metering assembly 14 including a fluted or toothed meter roller 16 disposed within meter roller housing unit 18. In a drive system commonly used in industry, a main meter roller drive input shaft (not shown) rotates upon forward movement of the air cart. Rotation of the drive shaft rotates the meter roller 16 causing product to dispense at a predetermined rate through the outlets 20 of housing unit 18 into the air distribution system 22 and through the ground openers (not shown) into furrows in the ground.

Occasionally, the operator may require only one-half of the meter roller 16 to be operational. This may occur when only one pass of half the implement is required to finish seeding a field. To facilitate this, the meter roller 16 of the present invention (FIGS. 2 and 3) is split into two halves, namely a driven half 24 and a controlled half 26 with each half connected via separate discharge outlets 20 in the otherwise conventional housing unit 18 (see FIGS. 7–10) to separate air distribution systems and corresponding soil openers.

The driven half 24 of the meter roller 16 is configured in a conventional manner and is supported upon bearing assemblies 28 at each end thereof and an axially extending main drive shaft 30 which is driven in rotation by a meter drive sprocket. Controlled half 26 also is supported upon bearing assemblies 32 similar to those for driven half 24.

Controlled roller half 26 has a hollow hexagonal shaft 34 extending axially therethrough and fixed for rotation therewith and through the hollow center of which a secondary drive shaft 36 axially extends, drive shaft 36 being pinned to the end of main drive shaft 30 for rotation therewith.

Figure 5:
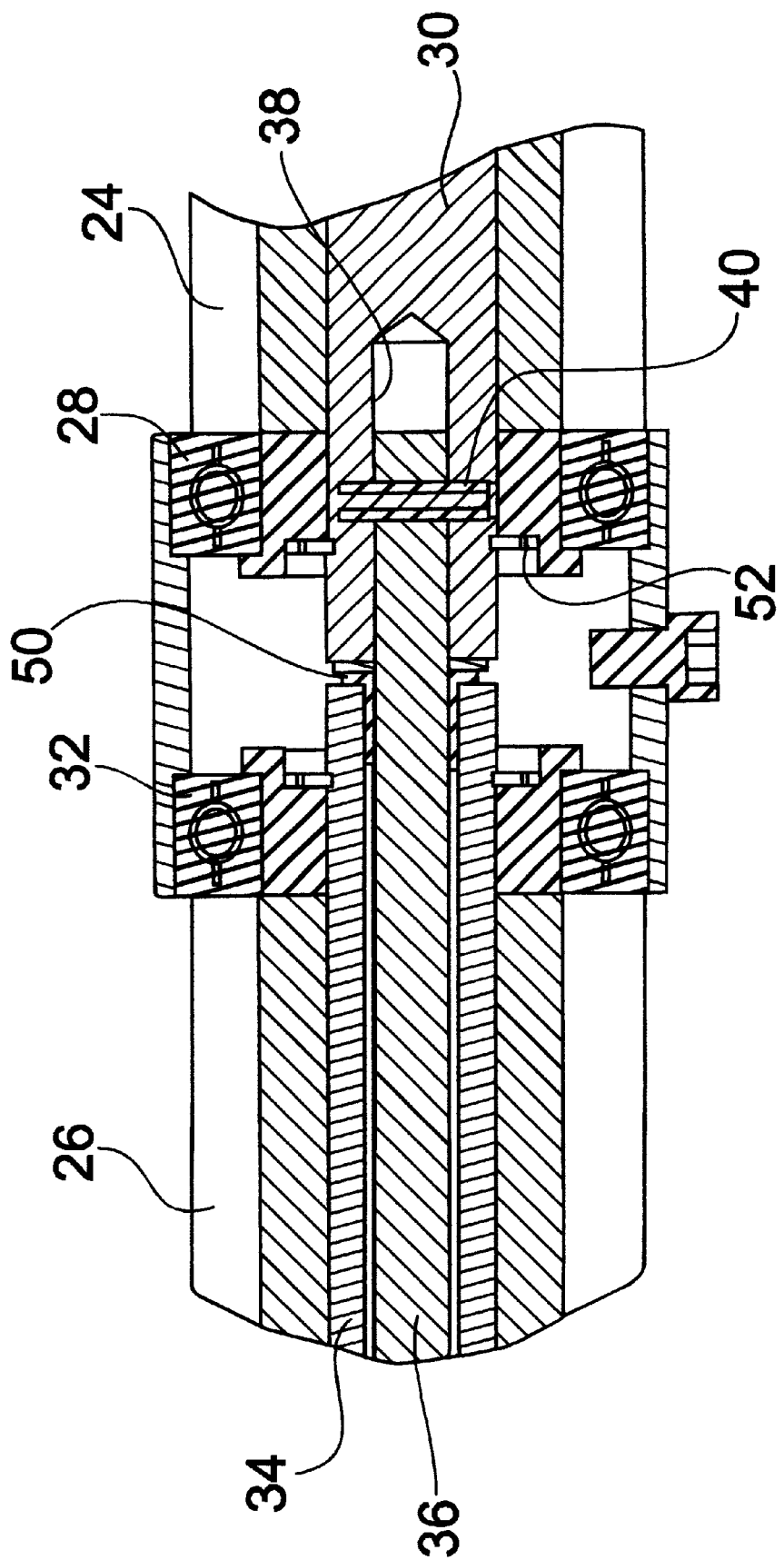
FIG. 5 is a section view of the interface between the two roller halves.

As best seen at the interface of driven roller half 24 and controlled half 26 (see FIG. 5), the main drive shaft 30 has an endwise bore 38 which receives an end of the secondary drive shaft 36. Secondary drive shaft 36 is coupled via roll pin 40 to main drive shaft 30. (Alternatively, secondary drive shaft 36 can be threaded to main drive shaft 30.) Secondary drive shaft 36, as noted above, extends axially through the hollow center of hexagonal shaft 34 and hence through the controlled half 26 of the meter roller.

Figure 3:
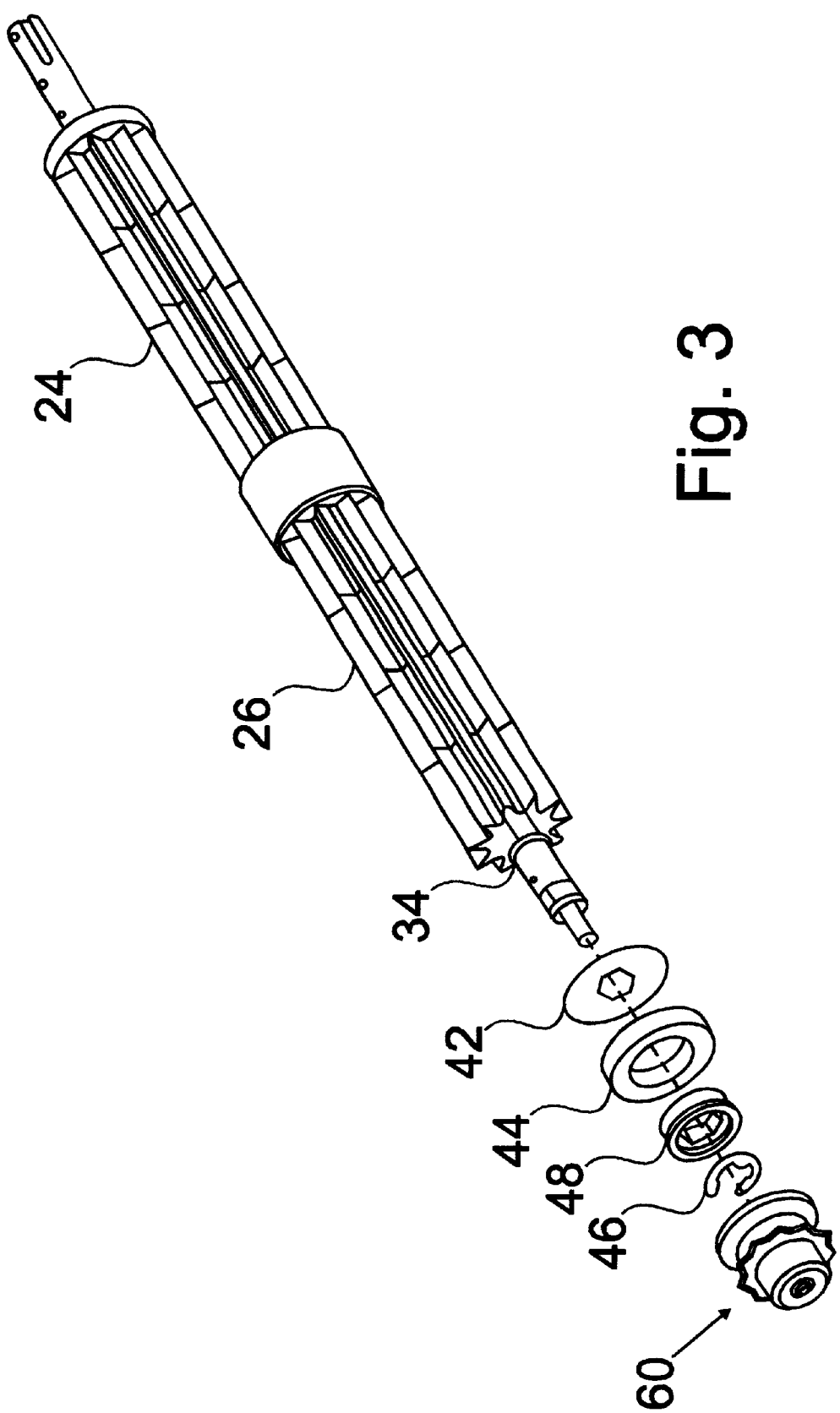
FIG. 3 is an exploded view of the bearing assembly at the end of the controlled half of the meter roller.

As noted above the controlled half 26 of the meter roller is supported by two bearing assemblies 32 (see FIG. 3). Bearing disc 42 is received on hex shaft 34 and bearing 44 is received on annular member 46 shaped to engage hex shaft 34. The assembly is then retained to hexagonal shaft 34 by snap ring 48. The entire assembly 32 fits onto the meter roller assembly and into the opening on the outer end of controlled meter roller half 26.

The driven half 24 of the meter roller is supported by a pair of bearing assemblies 28 similar to those for controlled half 26 of the meter roller. Bearing assemblies 28, however, do not engage hexagonal shaft 34 but are mounted to opposing ends of the main drive shaft 30 in conventional manner (see FIG. 5).

The interface (see FIG. 5) of the two meter roller halves 24, 26 also includes a bushing 50 between the end surfaces of the hexagonal shaft 34 and main drive shaft 30 and also between secondary drive shaft 36 and hexagonal shaft 34 to facilitate relative rotation between the hexagonal shaft 34 and the secondary drive shaft 36 when the clutch which acts between them is disengaged as described hereafter.

Figure 4:
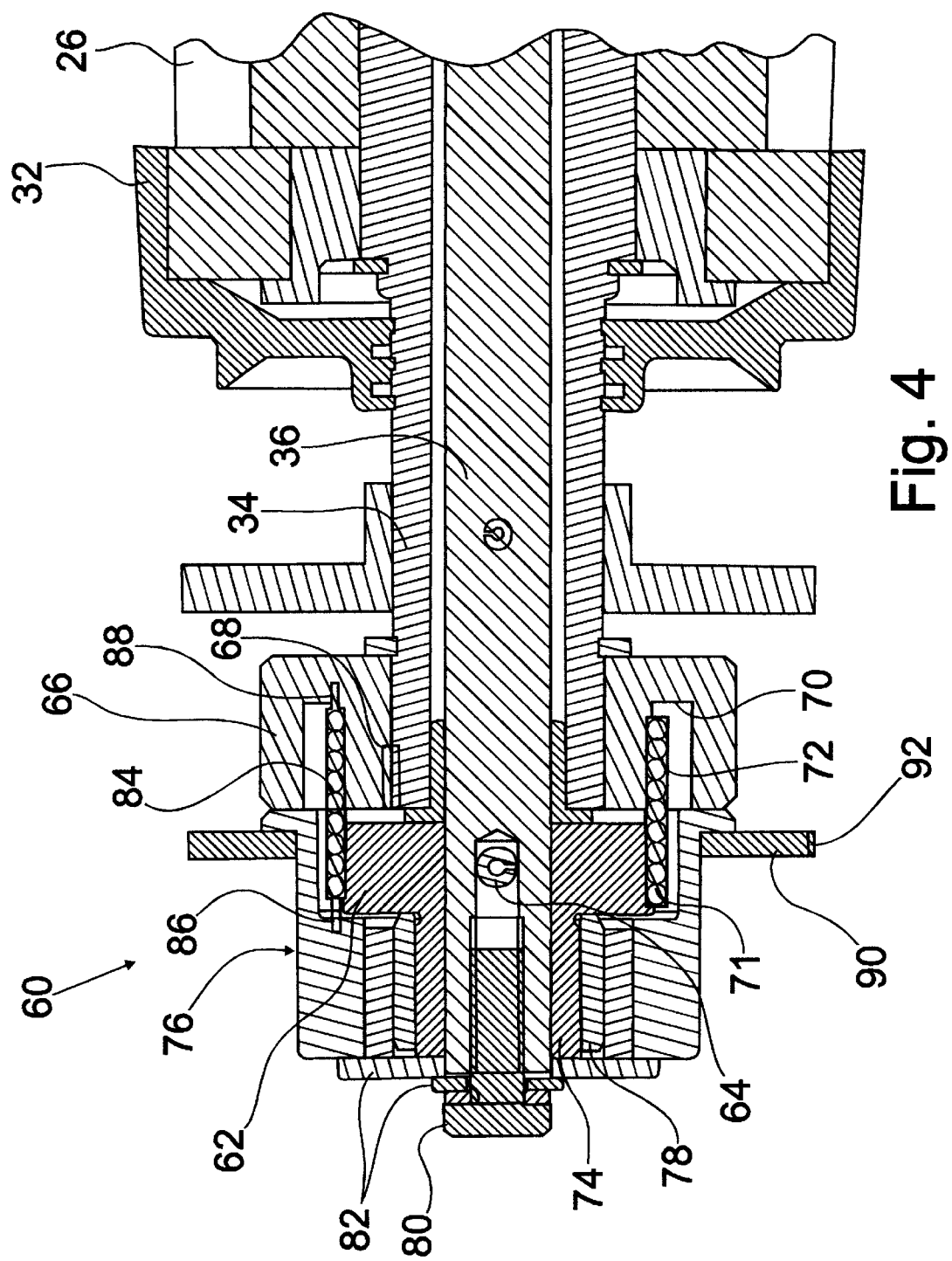
FIG. 4 is a section view of the wrap spring clutch assembly.
Figure 6:
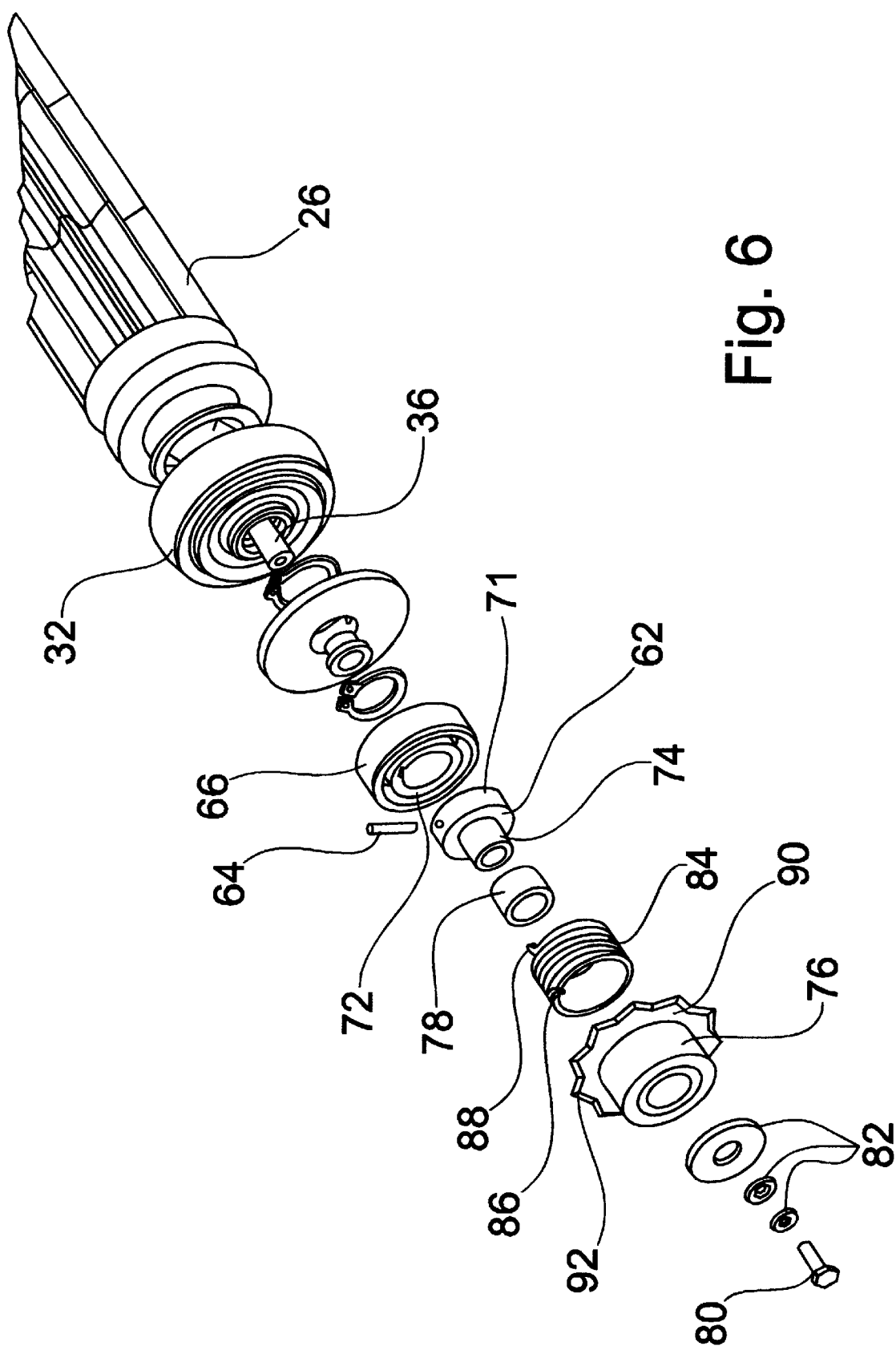
FIG. 6 is an exploded view of the wrap spring clutch assembly.
Figure 7:
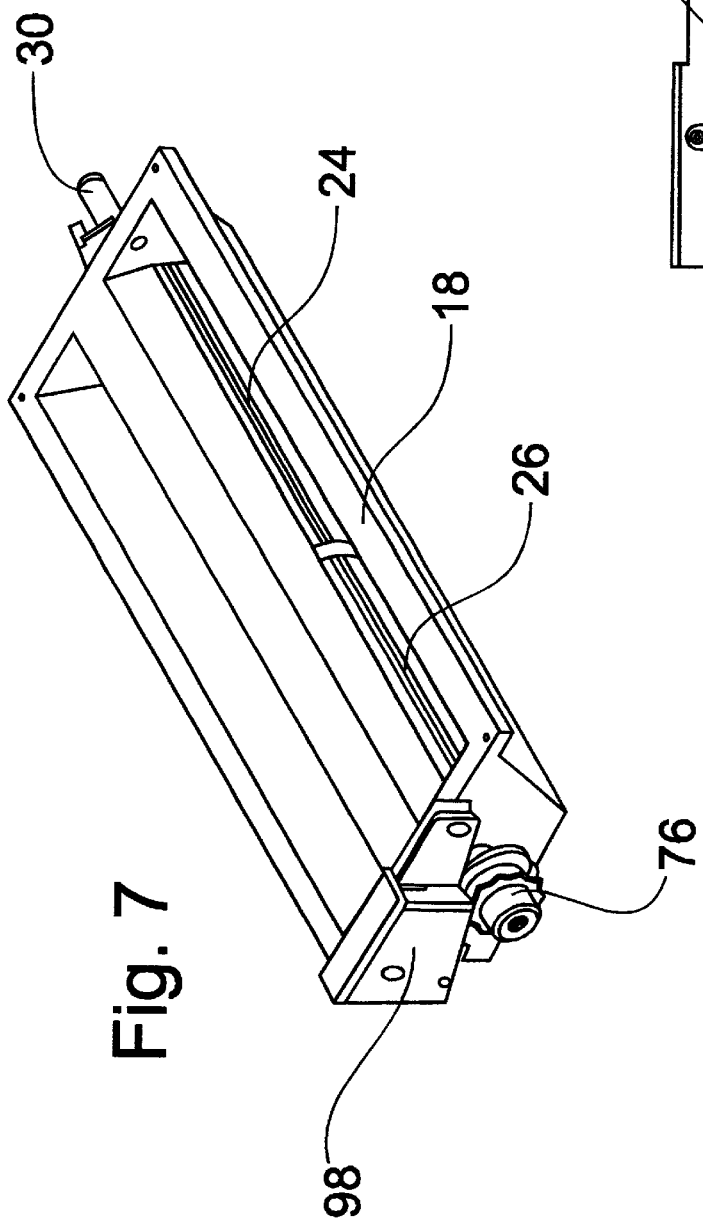
FIG. 7 is an isometric view of the meter roller housing unit.
Figure 8:
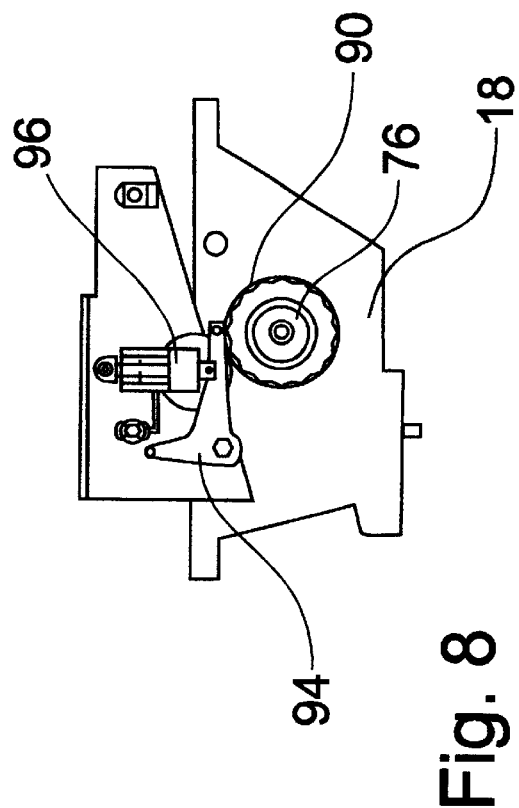
FIG. 8 is an end elevation view of the meter roller housing unit with a cover of the clutch housing removed.
Figure 9:
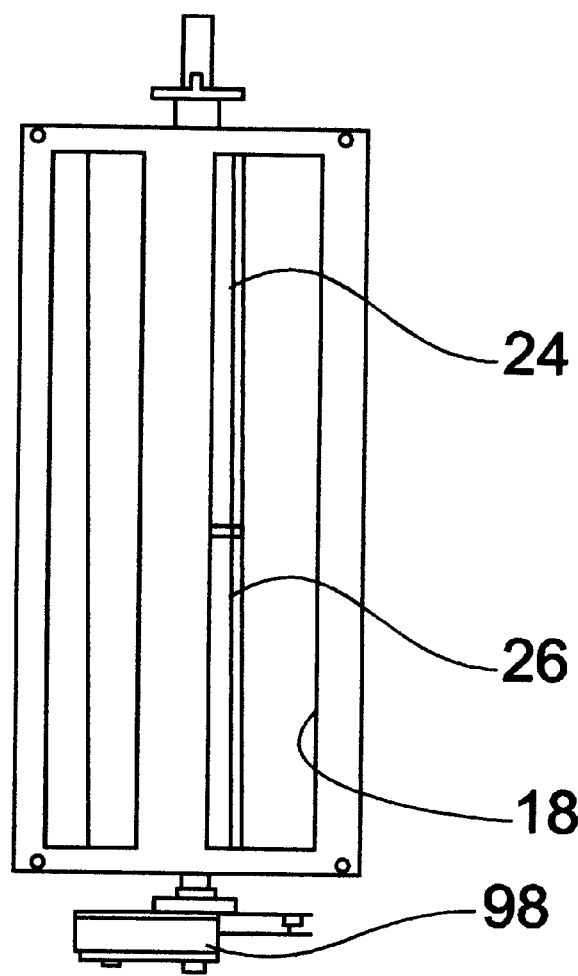
FIG. 9 is a top plan view of the meter roller housing unit.
Figure 10:
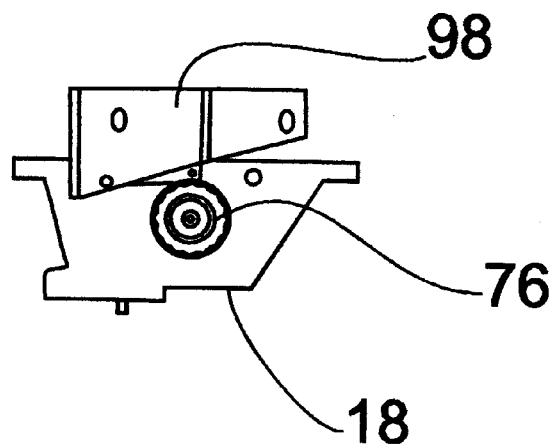
FIG. 10 is an end elevation view of clutch housing unit with cover mounted.

Wrap spring clutch 60 is best shown in FIGS. 4 and 6. Clutch driving member 62 is fixed by roll pin 64 to the outer end portion of secondary drive shaft 36. Clutch driven member 66 is co-axially located inboard of driving member 62 and is keyed to the outboard end of hexagonal shaft 34 via key 68 or similar anti-rotation device. Driven member 66 has an annular groove 70 in the face thereof which defines a cylindrical drum surface 72 located immediately adjacent to the cylindrical drum surface 71 defined by co-axially arranged driving member 62. Driving member 62 also has a smaller diameter co-axial cylindrical hub 74 formed thereon upon which a control hub 76 is rotatably mounted via intermediate bearing 78. Control hub 76 is maintained in close relation to drive member 62 by stud 80 threaded into the end of secondary drive shaft 36 in association with lock and retaining washer assembly 82.

A coil drive spring 84 wraps around both cylindrical drum surfaces 71 and 72 of the driving and driven members 62 and 66 respectively and is provided at its ends with oppositely extending spring tabs 86, 88 which engage in small bores formed in control hub 76 and driven member 66 respectively. Since drive spring 84 wraps snugly around driven drum surface 72 with tab 88 engaging the driven member 66, a driving connection is maintained between them. Spring 84 wraps around the driving drum surface 71 in a direction such that as the driving member 62 is rotated by shaft 36, the spring 84 tightens and rotates with it thus driving the driven member 66, hex shaft 34 and the controlled half 26 of the meter roll, while at the same time causing rotation of the control hub 76 along with them. However, when it is desired to stop rotation of the controlled half 26 of the meter roll, rotation of control hub 76 is stopped by engaging one of the spaced teeth 90 formed on the periphery of control hub sprocket 92 via a pivoting control latch 94 operated by solenoid 96 (see FIG. 8). Latch 94 and solenoid 96 are housed in housing 98 mounted to an end of the meter housing 18.

When control hub 76 is stopped, the drive spring 84 begins to unwrap slightly and the grip between it and drum surface 71 loosens so that driving member 62 can no longer rotate the driven member 66, the attached hexagonal shaft 34 and controlled half 26 of the meter roll. To re-start controlled roller half 26, the solenoid 96 is energized to release latch 94 thus allowing rotation of control hub 76. This in turn allows the drive spring 84 to tighten around both drum surfaces 71 and 72 thus effecting a driving relationship between these elements. The resulting rotation of the controlled half 26 of the meter roll causes product to be dispensed to the air system associated with that half of the meter roll and which carries the seeds to the corresponding ground openers.

Upon review of the preceding description, the detailed operation of the apparatus will be readily apparent. Upon forward movement of the air cart, the drive input rotates as per conventional means to drive meter roller main drive shaft 30 and the driven half 24 of the meter roll. The operator can choose to either have the controlled half 26 of the meter roller rotating, and thus dispensing product, or not. Thus, with solenoid 96 holding latch 94 free of control hub sprocket 90, the control hub 76 is free to rotate and hence a driving relation exists between driving and driven members 62 and 66 hence causing controlled half 26 and driven half 24 to rotate together to dispense product.

If the operator wishes to stop rotation of controlled half 26 of the meter roll, but to continue seeding with driven half 24, he simply disengages the spring clutch 60 by stopping rotation of control hub 76 as described above. This then will release the spring and expand the spring diameter about driving member 62. The driven member 66, hex shaft 34 and controlled half 26 of the meter roll stop rotating.

It is clear that control hub 76 is the instigator for the clutching mechanism. This hub 76 is controlled by the latch member 94 as described. This latch can be operated in a variety of ways. In the preferred embodiment of the invention as described, the latch is controlled by use of the solenoid 96. This allows the operator to control the latch electrically from his tractor cab. In other embodiments, the latch could be controlled manually by a mechanical linkage or hydraulically.

A preferred embodiment of the invention has been described and illustrated by way of example. Those skilled in the art will realize that various modifications and changes may be made while still remaining within the spirit and scope of the invention. Hence the invention is not to be limited to the embodiment as described but, rather, the invention encompasses the full range of equivalencies as defined by the appended claims.

Having thus described the invention, what is claimed is:

1. A product metering system for an air cart or the like comprising:

a meter roll having first and second axially aligned meter roll portions; a main drive shaft and a secondary drive shaft fixed to said main drive shaft for rotation therewith, the first roll portion being fixedly mounted on said main drive shaft for rotation therewith, said secondary drive shaft being co-axially arranged with and extending through said second roll portion, said first roll portion and the main and secondary drive shafts being rotatable relative to said second roll portion; and a mechanism interacting between said secondary drive shaft and said second roll portion for connecting the latter to said secondary drive shaft for rotation therewith and for disconnecting the same whereby said first roll portion may continue to rotate while rotation of said second roll portion is stopped.

2. The product metering system of claim 1 wherein said mechanism is a clutch mechanism selectively operable to effect said connecting and disconnecting functions.

3. The product metering system of claim 2 wherein said main drive shaft is connectable at one end of the meter roll to a main drive input and said clutch mechanism is located at the opposing end of the meter roll.

4. The product metering system of claim 3 wherein said second roll portion is mounted on and fixed to a hollow shaft which extends through said second roll portion and outwardly of said opposing end of the meter roll, said secondary drive shaft extending co-axially through the center of said hollow shaft and outwardly a distance beyond an outboard end portion of said hollow shaft.

5. The product metering system of claim 4 wherein said clutch mechanism comprises:
   a driving member fixed to an outboard end of said secondary drive shaft for rotation therewith;
   a driven member fixed to the outboard end portion of said hollow shaft; and
   clutching means for interacting between said driving and driven members for effecting a connecting and disconnecting action between said members.

6. The product metering system of claim 5 wherein said clutch mechanism further comprises:
   a clutch coil spring wrapped around said driving and driven members; and
   a control element mounted for rotation relative to said secondary drive shaft, said clutch spring having one end anchored to said driven member and an opposite end anchored to said control element with the direction of wrap of said clutch spring being such that
   (a) when said control element is free to rotate with said driving and driven members, rotation of said driving member tends to tighten said spring around said driving/driven members so that the rotation of said driving member is transmitted to said driven member; and
   (b) when said control element is prevented from rotating with said driving member, said spring tends to loosen around at least said driving member thereby to disconnect the driving relation between said members.

7. The product metering system of claim 6 wherein said first and second roll portions are located in a common meter roller housing, said housing having first and second outlet openings for the metered product associated with the respective first and second roll portions, said clutch mechanism being located outboard of an end portion of said housing, said main drive shaft being connectable to a main drive input at the opposing end of said housing; and a control mechanism for stopping rotation of said control element, on command, so as to disconnect said clutch.

8. The product metering system of claim 7 wherein said control mechanism includes a solenoid controlled latch engageable with said control element on command for stopping the rotation thereof.

9. The product metering system of claim 2 wherein said first and second roll portions are located in a common meter roller housing, said housing having first and second outlet openings for the metered product associated with the respective first and second roll portions.

10. The product metering system of claim 9 wherein said clutch mechanism is located outboard of an end portion of said housing with said main drive shaft being connectable to a main drive input at the opposing end of said housing.

11. The product metering system of claim 9 wherein support bearings are located at each of the opposing ends of each of said roll portions to permit free rotation thereof while helping to maintain the integrity of the complete meter roller.

12. In an air cart having a tank for storing product to be distributed, said tank having a discharge opening through which said product passes for distribution; a metering assembly operatively associated with said tank to meter said product passing through said discharge opening, said metering assembly including a meter roller disposed within a meter roller housing; a drive system for rotating said meter roller, the improvement comprising:
   said meter roller having first and second axially aligned roll portions;
   said drive system including:
     a main drive shaft having said first portion of said meter roller mounted thereon; and
     a secondary drive shaft fixed to said main drive shaft for rotation therewith, said secondary drive shaft being co-axially arranged with and extending through said second roll portion such that said first roll portion, said main drive shaft and said secondary drive shaft being rotatable relative to said second roll portion; and
   a clutch mechanism interacting between said secondary drive shaft and said second roll portion for connecting said second roll portion to said secondary drive shaft for rotation therewith, said clutch mechanism being selectively operable to disconnect said second roll portion from said secondary drive shaft so that said first roll portion may continue to rotate while rotation of said second roll portion is stopped.

13. The air cart of claim 12 wherein wherein said first and second roll portions are located in said meter roller housing, said housing having first and second outlet openings for the metered product associated with the respective first and second roll portions.

14. The air cart of claim 13 wherein said clutch mechanism is located outboard of an end portion of said housing with said main drive shaft being connectable to a main drive input at the opposing end of said housing.

15. The air cart of claim 14 wherein said clutch mechanism comprises:
   a driving member fixed to an outboard end of said secondary drive shaft for rotation therewith;
   a driven member connected to said second roll portion; and
   clutching means for interacting between said driving and driven members for effecting a connecting and disconnecting action between said members.

16. The air cart of claim 15 wherein said second roll portion is mounted on and fixed to a hollow shaft which extends through said second roll portion and outwardly of said opposing end of the meter roll, said secondary drive shaft extending co-axially through the center of said hollow shaft and outwardly a distance beyond an outboard end portion of said hollow shaft.

17. The air cart of claim 16 wherein said clutch mechanism further comprises:

a clutch coil spring wrapped around said driving and driven members; and a control element mounted for rotation relative to said secondary drive shaft, said clutch spring having one end anchored to said driven member and an opposite end anchored to said control element with the direction of wrap of said clutch spring being such that
  (a) when said control element is free to rotate with said driving and driven members, rotation of said driving member tends to tighten said spring around said driving/driven members so that the rotation of said driving member is transmitted to said driven member; and
  (b) when said control element is prevented from rotating with said driving member, said spring tends to loosen around at least said driving member thereby to disconnect the driving relation between said members.

18. The air cart of claim 17 wherein said clutch mechanism further includes a control mechanism for selectively stopping rotation of said control element to disconnect said clutch mechanism.

19. The air cart of claim 18 wherein said control mechanism includes a solenoid controlled latch engageable with said control element on command for stopping the rotation thereof.

20. A meter roller assembly for controlling the distribution of product carried in an air cart having a tank for carrying a supply of said product to be distributed, comprising:

first and second axially aligned roll portions;
a drive system including:
  a main drive shaft having said first portion of said meter roller mounted thereon; and
  a secondary drive shaft fixed to said main drive shaft for rotation therewith, said secondary drive shaft being co-axially arranged with and extending through said second roll portion such that said first roll portion, said main drive shaft and said secondary drive shaft being rotatable relative to said second roll portion; and
a mechanism interacting between said secondary drive shaft and said second roll portion for selectively operably connecting said second roll portion to said secondary drive shaft to effect rotation therewith such that said first roll portion may continue to rotate while rotation of said second roll portion is stopped.

21. The meter roller assembly of claim 20 wherein said mechanism further includes a control mechanism having a solenoid controlled latch for controlling the rotation of said second roll portion relative to said second control mechanism.

22. The meter roller assembly of claim 21 wherein said second roll portion is fixed to a hollow shaft which extends through said second roll portion and outwardly of said opposing end of the meter roll to define an outboard portion of said hollow shaft, said secondary drive shaft extending co-axially through the center of said hollow shaft and outwardly a distance beyond said outboard portion of said hollow shaft.

23. The meter roller assembly of claim 22 wherein said mechanism is a clutch mechanism selectively operable to effect said connecting and disconnecting functions, said clutch mechanism comprising:

a driving member fixed to an outboard end of said secondary drive shaft for rotation therewith;
a driven member fixed to the outboard end portion of said hollow shaft; and
said clutch mechanism interacting between said driving and driven members for effecting a connecting and disconnecting action between said members.

24. The meter roller assembly of claim 23 wherein said clutch mechanism further comprises:

a clutch coil spring wrapped around said driving and driven members; and a control element cooperable with said solenoid controlled latch and being mounted for rotation relative to said secondary drive shaft, said clutch spring having one end anchored to said driven member and an opposite end anchored to said control element with the direction of wrap of said clutch spring being such that
  (a) when said control element is free to rotate with said driving and driven members, rotation of said driving member tends to tighten said spring around said driving/driven members so that the rotation of said driving member is transmitted to said driven member; and
  (b) when said control element is prevented from rotating with said driving member, said spring tends to loosen around at least said driving member thereby to disconnect the driving relation between said members.

25. The meter roller assembly of claim 24 wherein said clutch mechanism further includes a control mechanism for selectively stopping rotation of said control element to disconnect said clutch mechanism.

* * * * *